May 31, 1966  E. L. SCHULTZ  3,253,468
ULTRAMICRO SAMPLING DEVICE
Filed Sept. 24, 1964

INVENTOR:
EUGENE L. SCHULTZ
BY
Dawson, Tilton, Fallon, Lungmus & Alexander
ATT'YS United States Patent Office 3,253,468
Patented May 31, 1966

3,253,468
ULTRAMICRO SAMPLING DEVICE
Eugene L. Schultz, Hollywood, Fla., assignor to Dade Reagents, Inc., Miami, Fla., a corporation of Florida
Filed Sept. 24, 1964, Ser. No. 399,051
20 Claims. (Cl. 73—421)

This invention relates to a drive for extracting micro quantities of test liquids from capillary collecting tubes and for systematically advancing such samples to a chemical analysis station.

In present sampling systems for the clinical analysis of body fluids for diagnostically significant factors such as sugar, urea, and the like, the volume of each sample must be relatively large because of the requirements of the sample pick-up methods and equipment. For example, one common form of mechanism utilizes a probe which is inserted into open-topped containers to extract portions of the fluid contents thereof. Although the amount of fluid required for analytical purposes is only a small fraction of the contents in each container, the mechanism will operate properly only if a substantial excess is presented for sampling.

The large size of such samples also has other drawbacks. Venous samples of adequate volume may be difficult to collect, handle and process. Also, where pretreatment of the samples is required, such as centrifugation, large samples may be cumbersome and time-consuming to manipulate and prepare for sampling and testing.

Accordingly, it is a main object of the present invention to provide a sampling device which overcomes the aforementioned defects and disadvantages of present sampling equipment. Specifically, it is an object to provide an apparatus adapted to extract micro samples of body fluids from conventional micro capillary tubes such as hematocrit collecting tubes.

Another object is to provide a device which is capable of withdrawing body fluid from a micro capillary tube and then advancing only a measured portion of the withdrawn amount to a testing station. In this connection, it is an object to provide a device which as adapted to withdraw fluid samples in sequence from a plurality of tubes and to advance portions of uniform volume of such samples to a testing station with each sample volume separated by a measured quantity of testing reagent.

A still further object is to provide a device which is relatively simple and inexpensive in structure and operation and which is easier to maintain and clean than conventional sampling equipment. An additional object is to provide an ultramicro sampling device which is readily adapted for use with automatic testing equipment.

Other objects will appear from the specification and drawings in which.

Figure 1:
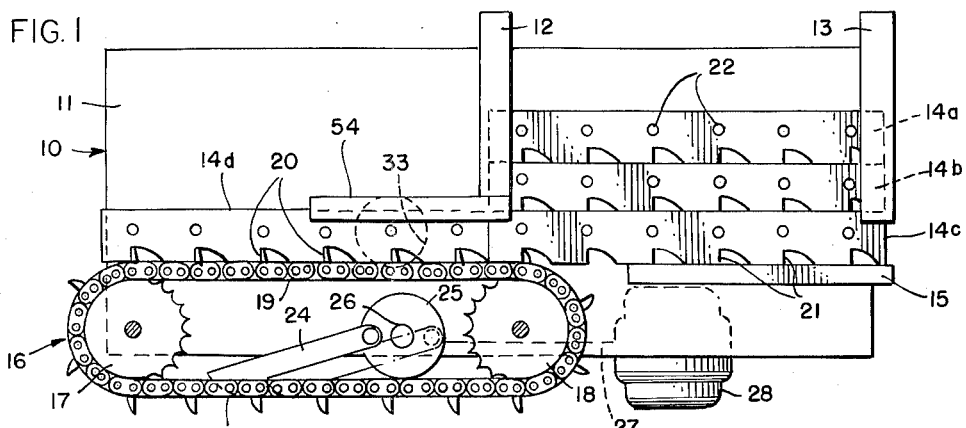
FIGURE 1 is a side elevational view of an ultramicro sampling device embodying the present invention.

In the embodiment of the invention illustrated in the drawings, the numeral 10 generally designates an ultramicro sampling device which, in the illustration given, is intended to be be a component of a complete automatic testing apparatus. The device includes a vertical mounting plate 11 to which all of the various elements of the sampling device are connected and which may in turn be bolted or otherwise secured within a suitable casing which houses not only the sampling device but also the other components of the testing apparatus.

Secured to the front of the mounting plate is a rack comprising a pair of upstanding channel members 12 and 13. The opposing U-shaped cross sectional configuration of the spaced channel members and the smooth front surface of the mounting plate retain and guide a stack of carrier bars 14a, 14b and 14c. A horizontal stop 15 spaced beneath the vertical channel members along the mounting plate's front surface serves to limit the extent of downward movement of the carrier bars retained by the rack. It will be observed from FIGURE 1 that the lower end of channel member 12 terminates above the level of stop member 15 to permit lateral sliding movement of the lowermost carrier bar into the position assumed by bar 14d. Such movement of the lowermost carrier bar is controlled by an advancing mechanism generally designated by the numeral 16.

The particular advancing mechanism illustrated in the drawings comprises a pair of sprockets 17 and 18 which have their horizontally-extending shafts journalled in the lower portion of the mounting plate 11 and which support a driving chain 19. The upper stretch of the chain is in horizontal alignment with the upper surface of stop member 15 so that a carrier bar retains the same elevation as it is shifted horizontally from the position assumed by bar 14c to the position occupied by bar 14d. Lugs 20 are provided by alternate links of the chain and project outwardly therefrom to engage the recessed undersurfaces of the bars and to advance the same into sampling position.

Figure 3:
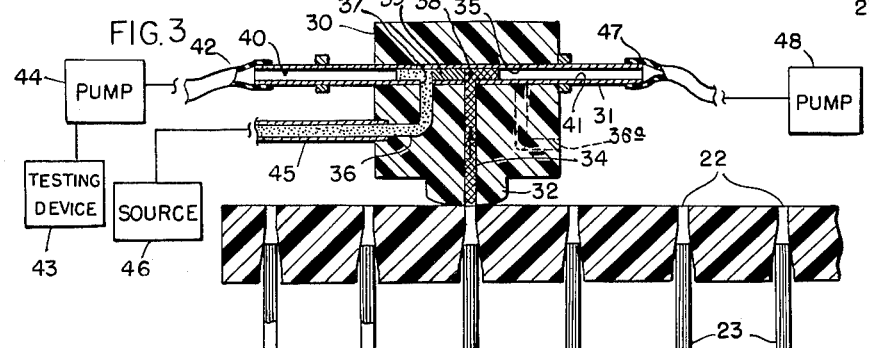
FIGURE 3 is a horizontal sectional view illustrating the device in an initial stage of its operation.

Each carrier bar is horizontally elongated and is provided with a series of recesses 21 along its undersurfaces to receive the lugs projecting upwardly from the upper stretch of driving chain. The bars are generally rectangular in cross sectional configuration and, as shown most clearly in FIGURES 1 and 3, are each provided with a horizontal series of transversely extending openings 22. The openings extend completely through each bar and are tapered for snugly receiving the end portions of collecting tubes 23. The collecting tubes may be conventional micro hematocrit capillary tubes formed of glass or plastic and, as such, are approximately 75 millimeters long and approximately 2 millimeters in outside diameter. Each capillary tube has a bore diameter of approximately 1 millimeter and is open at both ends.

It has been found that where the carrier bars (or at least the portions thereof about openings 22) are formed from a slightly resilient plastic material such as tetrafluoro ethylene, an effective seal is formed between the capillary tubes and the bar and, because of the resiliency of the plastic, the tubes are held firmly in place without danger that their edges will become chipped or broken. It is to be understood, of course, that other fluorinated hydrocarbons or other plastic materials having similar properties may also be used. Where the material of the bars is relatively non-resilient, suitable resilient inserts defining openings 22 may be used and, if desired, conventional O rings (not shown) of resilient material may be disposed within openings for yieldably and sealingly engaging tubes 23.

The advancing mechanism 16 includes drive and indexing means in the form of a ratchet element 24 which has one end pivotally and eccentrically mounted upon the peripheral portion of drive wheel 25 and which has its opposite end provided with a hook portion 24a which is freely engageable with the links of chain 19. Drive wheel 25 is carried by shaft 26 which is journalled in the mounting plate 11 and which is operatively connected to the drive shaft 27 of an electric motor 28.

The ratchet element is pivotally connected to the drive wheel 25 at a point from the axis of the wheel which measures one half the distance between adjacent openings 22 in each carrier bar. Therefore, when the drive wheel 25 executes one complete revolution, chain 19 will be rotated to advance the bars 14c and 14d a distance equal to the spacing between openings 22. It will also be noted that even when drive wheel 25 operates continuously, the advancement of the carrier bars will be intermittent because rotation of the chain and bars will occur only during the interval that the drive wheel rotates 180 degrees to shift the ratchet element from the solid line position to the broken line position as illustrated in FIGURE 1.

Mounted on the backside of plate 11 is a valve assembly 29 which includes valve block 30 and tubular valve member 31. Most desirably, the block is formed of tetrafluoro ethylene and the valve tube is formed of stainless steel or some other suitable material which is capable of forming a fluid-tight seal with the plastic material of the block.

Figure 2:
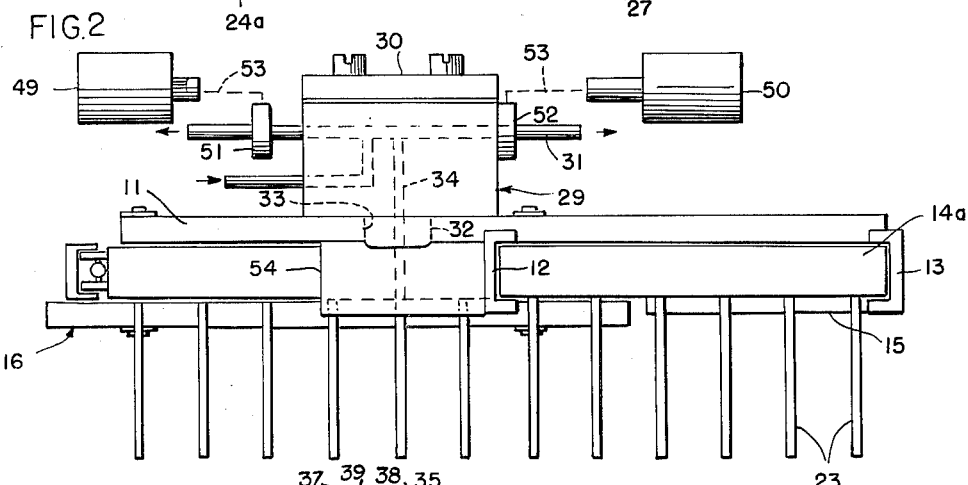
FIGURE 2 is a top plan view of the device shown partly in schematic form.

The block is provided with a projecting portion 32 which extends through an opening 33 in the mounting plate as shown in FIGURES 1 and 2. The end surface of the projecting portion extends slightly beyond the front surface of the mounting plate and slidably engages the side surfaces of the carrier bars advanced by mechanism 16. If desired, a resilient O ring may be mounted at the face of the mounting plate for yieldably and sealingly engaging the carrier bars; however, if both the block 30 and the carrier bars are formed of resilient material as described, such additional sealing means is believed unnecessary. An inlet passage 34 extends inwardly through the block 30 and projecting portion 32 and is positioned and arranged to communicate with each opening 22 in the carrier bars as such bars are indexed forwardly by the advancing mechanism.

Valve tube 31 is slidably carried in a bore 35 which extends through the valve block at substantially right angles to inlet passage 34 and which intersects the inlet passage as shown in FIGURE 3. A feed passage 36 also extends through the block and intersects bore 35 at a point spaced axially from the intersection with inlet passage 34. The valve tube 31, which is slidably received within the bore and which extends axially beyond the limits of the block is provided with a pair of side openings 37 and 38 which are spaced apart a distance corresponding with the spacing of passages 34 and 36 at the points where such passages intersect bore 35. Thus, when the valve tube 31 is in the position illustrated in FIGURES 2, 3 and 5, its interior communicates with both the inlet passage 34 and the feed passage 36 through openings 38 and 37 respectively. A plug 39 partitions the valve tube, dividing its interior into flow passages 40 and 41 extending outwardly in opposite axial directions.

One end of the valve tube 31 is connected to a flexible hose 42 which leads to the sample testing means diagrammatically illustrated in FIGURE 3 and designated by numeral 43. Interposed along the line between the valve tube and the sample testing means is an adjustable rate pump 44. Since such pumps are commonly available in the art, pump 44 has been illustrated only diagrammatically.

Feed passage 36 communicates with conduit 45 which extends from a reservoir 46 containing a supply of a testing reagent. Upon operation of pump 44 while the valve member is in the position illustrated in FIGURES 2, 3 and 5, reagent is withdrawn from the reservoir and flows through passages 36 and 40 towards the sample testing station.

The opposite end of valve tube 31 is similarly connected to a flexible hose 47 which leads to another adjustable rate pump 48. Fluid drawn by pump 48 through passage 41 and hose 47 is discharged to waste. Optionally, a second passage 36a (shown in broken lines in FIGURE 3) may be provided to vent the waste pump line 41, 47 when a continuous flow pump is used.

Figures 4, 5:
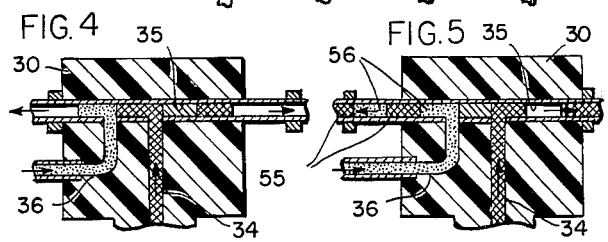
FIGURE 4 is a horizontal sectional view similar to FIGURE 3 but illustrating the valve tube in a second position of adjustment.
FIGURE 5 is a horizontal sectional view similar to FIGURES 3 and 4 but showing the effect on fluid flow when the valve tube is returned to its first position of adjustment.

Movement of the valve tube between the position of FIGURES 3 and 5 and the position of FIGURE 4 may be accomplished either manually or mechanically. In the illustration given, a pair of solenoids 49 and 50 are diagrammatically represented as being operatively connected to stop members 51, and 52 secured to opposite end portions of the valve tube. Broken lines 53 represent mechanical linkages between the solenoid plungers and the stop elements and it is to be understood that the solenoids must be mounted in fixed relation with respect to mounting plate 11 so as to produce longitudinal displacement of the valve tube into either of its operative positions depending upon the particular solenoid which is energized.

It will be noted that one of the sprocket wheels 18 of the advancing mechanism is disposed beneath the rack defined by vertical channel members 12 and 13. The upper stretch of drive chain extends beneath the lowermost carrier bar 14c of the stack as well as beneath bar 14d which is in axial and horizontal alignment with the lowermost bar. Two bars are therefore advanced simultaneously by the indexing mechanism without variation in the spacing between openings 22 even where a pair of such openings are provided by successive bars.

To resist any tendency of an indexed bar to move upwardly, and to hold its side surface in snug sealing engagement with the end surface of projection 32, an additional channel member 54 is provided along the front surface of the mounting plate directly above the mouth of inlet passage 34, as shown in FIGURES 1 and 2.

In automatic operation, a carrier bar is advanced from the rack into a position in which the first capillary tube of the series supported thereby communicates directly with inlet passage 34. Pump 48 operates as a "presampler" pump and, with the valve tube 31 in the position illustrated in FIGURE 3, operates to draw the sample from the capillary tube into the inlet passage. Immediately after the fluid from the capillary tube has reached the juncture of inlet passage 34 and valve passage 41, as determined by an elapsed predetermined interval, solenoid 50 is energized by the operation of a conventional timer switch (not shown) to shift the valve tube into the position illustrated in FIGURE 4.

Prior to actuation of solenoid 50, pump 44 operates to draw reagent from reservoir 46 through passage 36 and valve passage 40. When the solenoid is actuated to slide the valve tube into the position of FIGURE 4, opening 37 in the valve tube is shifted out of register with passage 36 and into alignment with inlet passage 34. Further flow of reagent into the valve tube is blocked, and pump 44 instead draws a slug or sample of test fluid from the inlet passage into the flow passage 40 of the valve tube. When, after a predetermined interval, the valve tube is again returned to its original position by energizing of solenoid 49, the flow of test fluid into passage 40 is interrupted and the flow of reagent into that passage is resumed. The return stroke of the valve member is synchronized with the operation of the advancing and indexing mechanism 16 so that as the valve tube returns to its original position the capillary tube carrier bar is indexed forwardly to position the next capillary tube in communication with inlet passage 34.

The result of such operation is that alternate segments of test fluid and reagent advance along valve passage 40 and line 42 to the sample testing station. The effect is best illustrated in FIGURE 5 where the segments of sample are represented by the cross hatched areas 55 and the reagent segments are represented by the dotted areas 56.

While an automatic cycle of operation has been described in detail, it will be understood that the same steps may be carried out manually by shifting the valve tube by hand or by electrically actuating the solenoids for only a single cycle of operation.

While in the foregoing, I have disclosed an embodiment of the invention in considerable detail for purposes of illustration, it will be understood by those skilled in the art that many of these details may be varied without departing from the spirit and scope of the invention.

I claim:

1. In an ultramicro sampling device, a valve block having an inlet passage and also having a through bore intersecting said inlet passage, an open-ended valve tube slidably mounted within said bore and being provided with a pair of axially-spaced side wall openings intermediate said ends, blocking means within said tube between said side wall openings, said tube being slidable between a first position wherein one of said side openings is in register with said inlet passage and a second position wherein said other opening is in register with said inlet passage, and means for removably supporting an open-ended collecting tube in communicating relation with said inlet passage.

2. The structure of claim 1 in which said block is formed of a resilient plastic material.

3. The structure of claim 1 in which stop means are provided by said device for stopping said tube in said first and second positions.

4. The structure of claim 1 in which means are provided for shifting said valve tube between said first and second positions.

5. In a sampling device, the combination of a valve block having an inlet passage and also having a bore intersecting said passage, an open-ended valve tube slidably mounted within said bore and provided with a pair of axially-spaced side wall openings intermediate said ends, partition means within said valve tube between said side wall openings, said tube being slidable between a first position wherein one of said side openings is in register with said inlet passage and a second position wherein said other opening is in register with said inlet passage, operating means for shifting said tube between said first and second positions, pump means for drawing fluid into said valve tube from said inlet passage, and means for successively positioning a series of sample-containing tubes in communicating relation with said inlet passage, said last-mentioned means being synchronized with the operation of said pump means and said operating means for the successive drawing of said samples into said inlet passage and into said valve tube.

6. The structure of claim 5 in which said block is formed from a resilient plastic material.

7. The structure of claim 5 in which said operating means includes electrically-actuated means for shifting said valve tube between said first and second positions.

8. The structure of claim 5 in which stop means are provided by said device for stopping said tube in said first and second positions.

9. In a sampling device, the combination of a valve block having an inlet passage and also having a bore intersecting said passage, an open-ended valve tube slidably mounted within said bore and being provided with a pair of axially-spaced side wall openings intermediate its ends, partition means within said tube between said side wall openings, said tube being slidable between a first position wherein one of said side wall openings is in register with said inlet passage and a second position wherein said other of said openings is in register with said inlet passage, said valve block also having a second passage intersecting said bore, said second passage communicating with said other of said openings of said valve tube when said valve tube is in its first position.

10. The structure of claim 9 in which said second passage is also in communication with a reagent source.

11. The structure of claim 9 in which means are provided for removably supporting an open-ended sample-containing tube in communicating relation with said inlet passage.

12. The structure of claim 9 in which said block is formed of a resilient plastic material and said valve tube is metal.

13. The structure of claim 9 in which means are provided for shifting said valve tube between said first and second positions.

14. In a sampling device, the combination of a valve block having an inlet passage and also having a bore intersecting said passage, an open-ended valve tube slidably mounted within said bore and being provided with a pair of axially-spaced side wall openings intermediate said ends, a partition within said tube between said side wall openings and dividing the interior thereof into a pair of valve tube passages extending axially in opposite directions, said valve tube being slidable between a first position wherein one of said side openings is in register with said inlet passage and a second position wherein said other of said openings is in register with said inlet passage, said valve block also having a second passage intersecting said bore and communicating with said other of said openings of said valve tube when said valve tube is in its first position, pump means for drawing fluid into said valve tube when said tube is in said first and second positions, and means for shifting said valve tube between said first and second positions, said last-mentioned means being synchronized with the operation of said pump means for drawing fluid from said inlet passage into one of said valve tube passages when said valve tube is in its first position and into the other of said valve tube passages when said tube is in its second position.

15. The structure of claim 14 in which means are provided by said device for successively positioning a series of sample-containing tubes in communicating relation with said inlet passage, said last-mentioned means being synchronized with the operation of said pump means for successively drawing said samples into said inlet passage and into the oppositely directed passages of said valve tube.

16. The structure of claim 14 in which said valve block is formed of tetrafluoro ethylene.

17. The structure of claim 14 in which stop means are provided by said valve tube for stopping the same in said first and second positions.

18. A sampling device comprising a valve block having an inlet passage and also having a bore intersecting said passage, an open-ended valve tube slidably mounted within said bore and being provided with a pair of axially-spaced side wall openings intermediate said ends, a partition within said tube between said side wall openings dividing said tube into a pair of oppositely directed valve tube passages, said valve tube being slidable between a first position wherein one of said side openings is in register with said inlet passage and a second position wherein said other opening is in register with said inlet passage, a sample tube carrier bar having a series of uniformly-spaced transverse openings therethrough, each of said openings being adapted for removably receiving an open-ended sample tube inserted therein from one side of said bar, and an indexing mechanism for supporting said bar with the opposite side thereof in slidable contact with said valve block and for intermittently advancing said bar to position the openings therein in successive flow communication with said inlet passage.

19. The structure of claim 18 in which said carrier bar is formed of plastic material and the transverse openings therethrough are tapered for snugly and sealingly receiving the end portions of said sample tubes.

20. The structure of claim 18 in which means are provided for shifting said valve tube between said first and second positions, said last-mentioned means and said indexing mechanism being synchronized for placing the oppositely directed valve passages of said valve tube in flow communication with each of the sample tube carried by said bar.

References Cited by the Examiner

UNITED STATES PATENTS 2,729,974  1/1965  Stein _____ 73—425.4

FOREIGN PATENTS 735,638  8/1955  Great Britain.

LOUIS R. PRINCE, *Primary Examiner.*